United States Patent [19]

Gurumurthy

[11] Patent Number: 4,593,374

[45] Date of Patent: Jun. 3, 1986

[54] TELETEXT MAGAZINE CODE DETECTOR

[75] Inventor: Kadagattor V. Gurumurthy, Indianapolis, Ind.

[73] Assignee: RCA Corporation, Princeton, N.J.

[21] Appl. No.: 543,058

[22] Filed: Oct. 18, 1983

[51] Int. Cl.[4] ............... G06F 11/10; G06F 15/40
[52] U.S. Cl. .................. 364/900; 371/37
[58] Field of Search ................. 371/37, 25;
364/200 MS File, 900 MS File, 514, 737;
340/146.2, 789

[56] References Cited

U.S. PATENT DOCUMENTS

| 4,075,460 | 2/1978 | Gorgens | 364/465 X |
| 4,091,441 | 5/1978 | Clausing | 364/200 |
| 4,141,078 | 2/1979 | Bridges, Jr. et al. | 364/900 |
| 4,390,968 | 6/1983 | Hennessy et al. | 364/900 |

FOREIGN PATENT DOCUMENTS

| 1207201 | 9/1970 | United Kingdom . |
| 1345486 | 1/1974 | United Kingdom . |
| 1471953 | 4/1977 | United Kingdom . |
| 2104264A | 3/1983 | United Kingdom . |

OTHER PUBLICATIONS

"Wireless World Teletext Decoder", part 1–8, published in *Wireless World,* Nov. 75–Jun. 76.
Article by P. Frandon & G. Chauvel entitled "Antiope LSI", published in IEEE Transactions on Consumer Electronics, vol. C-25, No. 3, Jul. 1979, pp. 334–338.

*Primary Examiner*—Charles E. Atkinson
*Attorney, Agent, or Firm*—Eugene M. Whitacre; Paul J. Rasmussen; Joseph J. Laks

[57] ABSTRACT

In a teletext decoder, a magazine code detector detects a sought after magazine number in an error-encoded teletext signal. A memory stores all allowable magazine code numbers in error-encoded form. A keyboard or remote control enters into a microprocessor, in uncoded form, the sought after magazine number. The microprocessor addresses the memory location where the corresponding error-encoded magazine number is stored to develop at the output of the memory those encoded bytes of data that represent the sought after magazine number. The encoded bytes are compared to the bytes of incoming data in the teletext signal to determine the presence of the sought after magazine number in the teletext transmission.

5 Claims, 4 Drawing Figures

TELETEXT MAGAZINE CODE DETECTOR

This invention relates to the detection of particular encoded bytes of data, such as the magazine number, within a teletext signal.

Teletext is a means for transmitting textual and graphical information by digitally encoding the transmission. In a teletext-like digital transmission, the digital code may be incorporated into a television signal. The specific manner of encoding may vary somewhat depending on the system or standard used. By way of example only, what follows is in conformance with the North American Broadcast Teletext Specification (NABTS).

The teletext encoded composite video signal is schematically illustrated in FIG. 3a. During a horizontal line interval, $T_H$, the teletext encoded signal includes a horizontal sync portion, a color sync burst portion, and a teletext data line portion of duration $T_T$. A teletext data line may be transmitted during particular lines of the vertical blanking interval or may be transmitted during almost every horizontal line for full-field teletext transmission.

The transmission bit rate of the data signal in a teletext date line is the 364th multiple of the horizontal line scanning rate or approximately 5.7 megabits per second for the NTSC horizontal line scanning rate. When the data signal is inserted into color television transmission, the transmission bit rate is 8/5 of the color subcarrier rate and phase locked to the subcarrier. When the data signal is inserted into a monochrome television transmission (with no burst), the transmission bit rate is phase locked to the horizontal line scanning synchronizing signal.

The amplitude modulated teletext data uses a raised cosine, non-return-to-zero binary code. The logical "0" is by definition set at the blanking level of the video signal. A data slicer, equivalent to a one-bit digital to analog converter, converts the amplitude modulated teletext signal into a string of logic bits. The maximum length of the string in each data line is 288 bits, arranged as 36 8-bit bytes, as illustrated in FIG. 3b. All bytes have their least significant bit transmitted first.

The teletext data line of FIG. 3b is divided into two parts: the synchronization sequence comprising the first three bytes of the data line and the data packet comprising the remaining bytes. The first two bytes of the synchronization sequence constitute the clock run-in or clock synchronization sequence, consisting of a 16-bit alternating sequence of "1"s and "0"s. The clock synchronization sequence of the teletext signal provides a reference signal that initializes the data slicer and that synchronizes the teletext decoder system clock. The third byte of the synchronization sequence is the framing code. When its presence is detected, it is used as a reference byte for byte synchronization of the decoder.

The data packet is the group of bytes following the synchronization sequence and is organized into three sections. The first section consists of the packet prefix, bytes 4 through 8, and the remaining two sections, not illustrated in FIG. 3b, consist of the data block and optional suffix, respectively. The data block may contain presentation or message data or additional control data. The suffix contains data that is useful in checking for transmission errors.

In the packet prefix, bytes 4 through 6 consist of the packet address or magazine code, bytes P1, P2, and P3. Byte 7 of FIG. 3b consists of the continuity index byte that detects loss of a packet during transmission reception, or decoding. Byte 8 consists of the packet structure byte that defines the packet as being a synchronizing or standard packet.

All of the bytes of the packet prefix are Hamming encoded bytes, wherein bits b1, b3, b5, b7 provide Hamming protection and bits b2, b4, b6, b8 contain the data or message, such as address information in the magazine code bytes P1–P3. The three bytes of the magazine code contain 12 information bits and yield $2^{12}$ or 4,096 possible data channels or packet addresses. The Hamming encoding method allows detection of an even multiple of errors and correction of a single error.

It is known in the prior art to detect the magazine number by means of a complicated mix of hardware logic and software programming that decodes the Hamming encoded magazine bytes P1–P3. The microprocessor of the teletext decoder must therefore devote a substantial amount of software and processing time to decode the teletext magazine code bytes.

A feature of the invention is a teletext decoder that detects the presence of a particular byte of incoming teletext data, such as the sought after magazine number, in a simplified and expeditious manner, without the need for using relatively complicated Hamming decoding algorithms. The teletext decoder, in accordance with an aspect of the invention, is capable of detecting a sought after item of information, such as a magazine number, in a teletext signal. Incoming bytes of data are formed from the error encoded teletext signal. A binary signal is generated that represents a sought after item of information in uncoded form. An encoder responsive to the binary signal generates an error encoded byte representing the sought after item of information. A detector is coupled to the output of the encoder and is responsive to the incoming bytes of data to detect the presence of the sought after item of information in the teletext signal.

As another feature of the invention, the encoder comprises a memory having locations where there are stored a plurality of error encoded bytes representing different items of information. The binary signal representing the sought after item of information addresses the memory location where there is stored the corresponding error encoded byte. The sought after item of information, now in error-encoded byte form, is compared to the bytes of incoming teletext data to determine the presence of the sought after information in the teletext transmission.

Figure 1:
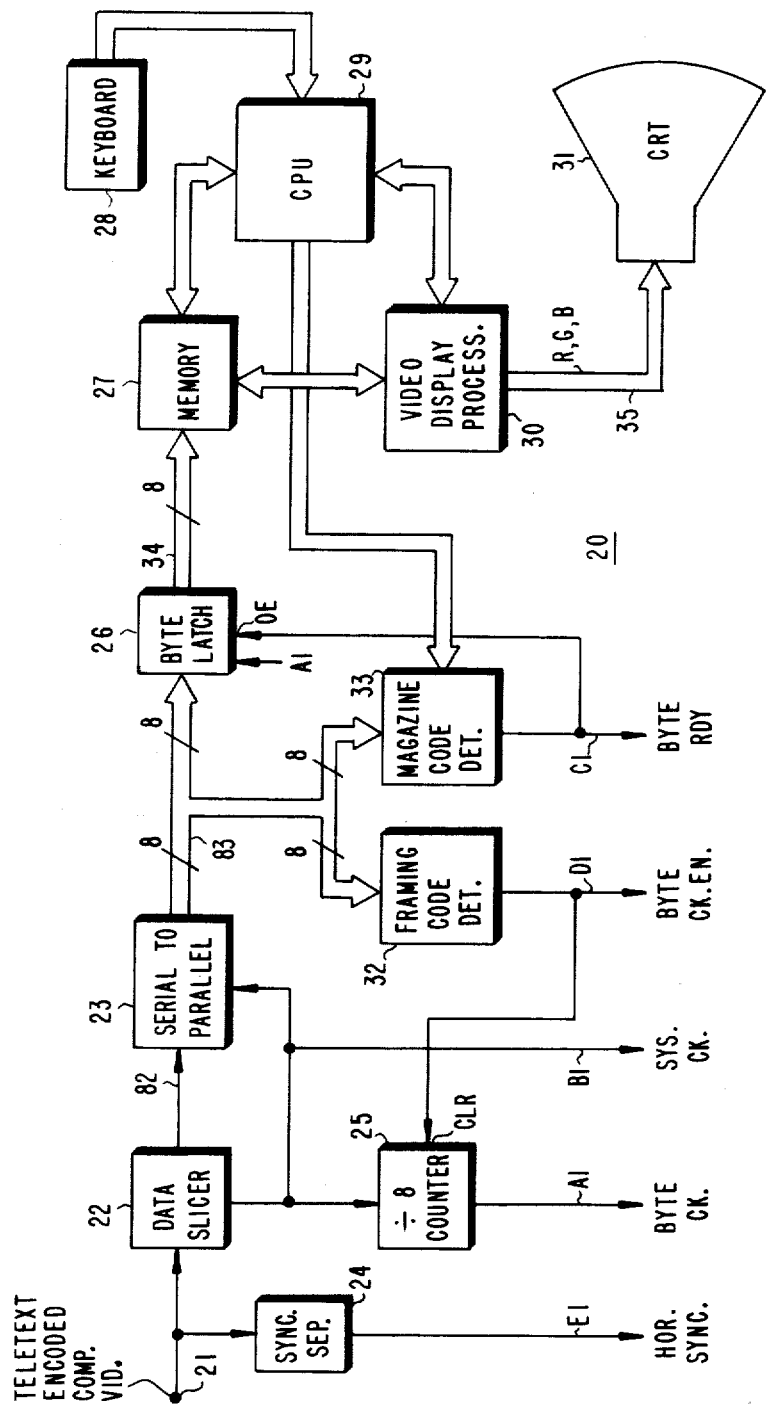
FIG. 1 illustrates a teletext decoder including a magazine code detector embodying the invention.
Figure 3:
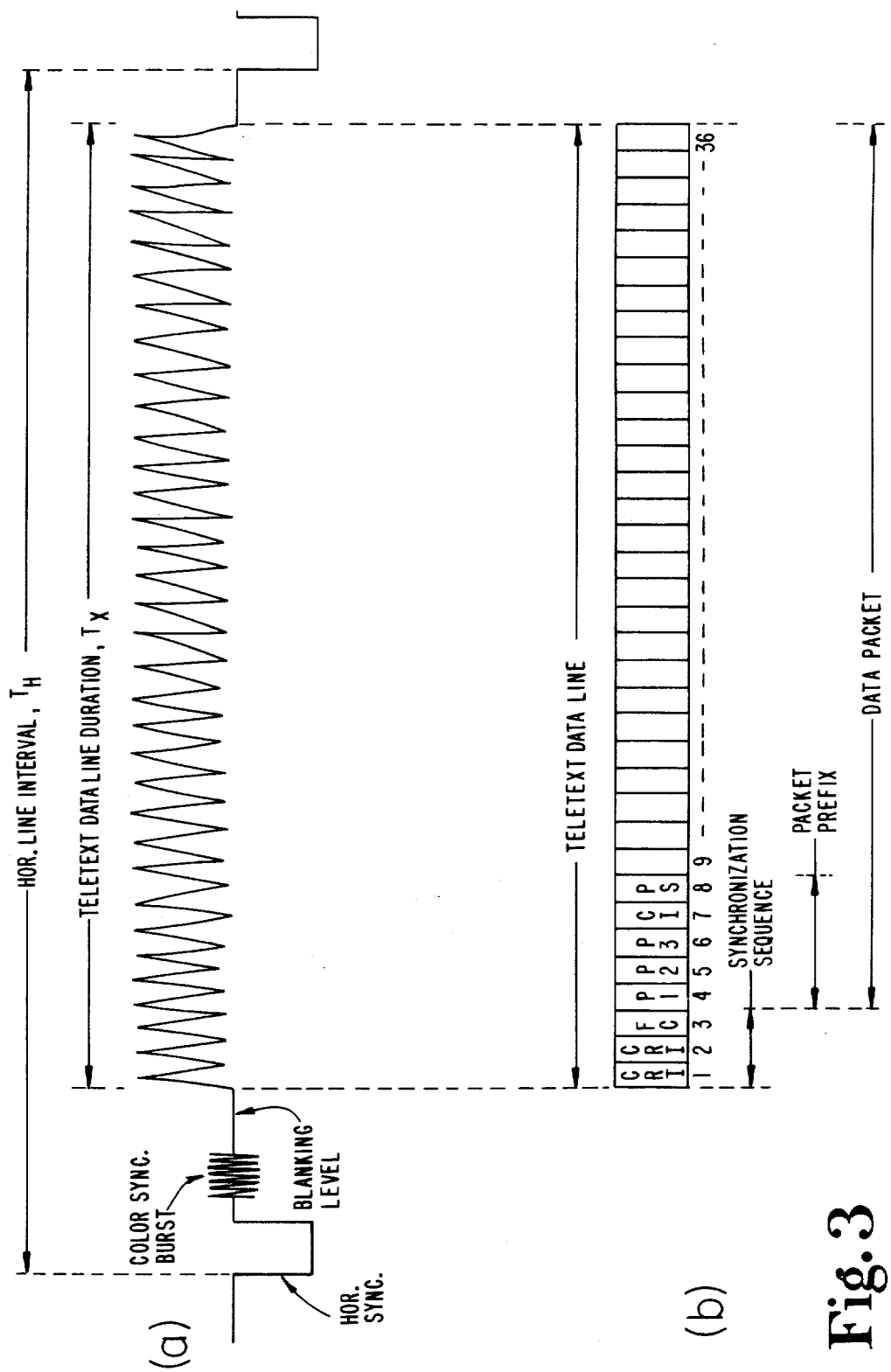
FIG. 3 comprised of FIGS. 3a and 3b schematically illustrates a teletext data packet.

In teletext decoder 20 of FIG. 1, a teletext-like encoded composite video signal, of the type, for example, that is schematically illustrated in FIG. 3a, is applied to an input terminal 21 of a data slicer 22. Data slicer 22 changes the amplitude modulated signal into a stream of serial bits appearing on a data line 82. Data slicer 22 also generates a teletext system clock on signal line B1 that is of the same frequency and that is in phase synchronism with the clock run-in bits of the synchronization sequence of the teletext packet. A sync separator 24 generates a horizontal sync signal along a signal line E1 that is derived from the teletext encoded composite video signal.

The data stream of serial bits developed on data line 82 is applied to a serial-to-parallel converter 23. Converter 23 generates from the serial data 8-bit bytes appearing on a data bus 83. Operation of serial-to-parallel converter 23 is synchronized by means of the teletext system clock. The eight output signal lines of serial-to-parallel converter 23 are coupled to a byte latch 26 for the purposes of buffer storage.

A byte clock signal is developed on a signal line A1 from the teletext system clocks by means of a divide-by-8 counter 25. Thus, the byte clock is generated at the same rate as that of complete bytes of teletext data.

To synchronize the byte clock signal to the incoming bytes of teletext data, a framing code detector 32, detects the presence of the framing code byte, byte 3 in the teletext data line of FIG. 3b. Upon detection of the framing code byte, framing code detector 32 develops a byte clock enable signal along a signal line D1. The byte clock enable signal is applied to the clear control terminal CLR of counter 25, initializing that counter and synchronizing byte clock signal generation to framing code byte generation and therefore to generation of all subsequent bytes within the teltext data line. Framing code detector 32 may be of conventional design or may be of design similar to that described in U.S. patent application Ser. No. 543,034, concurrently filed herewith, by K. V. Gurumurthy, entitled TELETEXT FRAMING CODE DETECTOR, hereby incorporated by reference.

The user of teletext decoder 20 enters into a microprocessor 29, illustratively by means of a keyboard 28, the magazine and page numbers of the information that is to be displayed on a device such as a cathode ray tube 31. A magazine code detector 33 embodying the invention and to be further described detects the presence of the magazine code bytes P1, P2, and P3 corresponding to the magazine number entered by the user. When the correct magazine code bytes are detected, indicating the transmission of a teletext data line having information that the user wishes to display, a byte ready signal is developed along a signal line C1.

The byte ready signal is applied to the terminal OE of byte latch 26 to enable the latch to pass through data onto a data bus 34. The byte clock signal developed on signal line A1 is applied to byte latch 26 to place on data bus 34 the eight bits of incoming data that form a byte of teletext packet information.

The stream of teletext bytes developed along data bus 34 is stored in a memory 27. Memory 27 is accessed by both microprocessor 29 and a video display processor 30 for retrieval of both control and display data. Memory 27 is represented in schematic form only and may be distributed among the various devices communicating therewith. Video display processor 30, under control of microprocessor 29, generates, R, G, B signals that are applied to cathode ray tube 31 along a signal bus 35 to provide a display of the teletext message or graphics.

Figure 2:
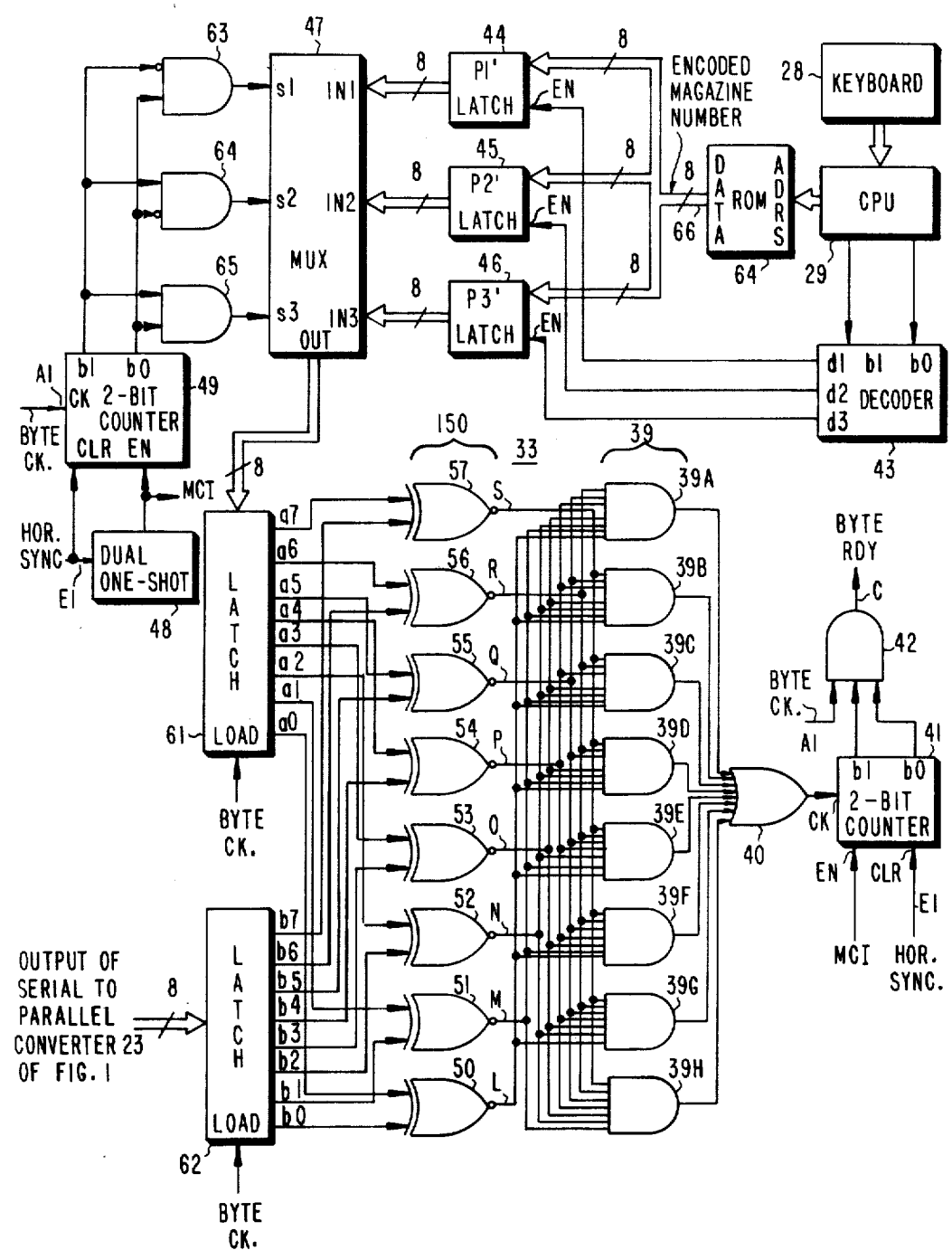
FIG. 2 illustrates a specific embodiment of the magazine code detector of FIG. 1.

FIG. 2 illustrates a portion of teletext decoder 20 of FIG. 1, including a specific embodiment of magazine code detector 33. As just mentioned, the user of teletext decoder 20 enters into microprocessor 29 the magazine number of the sought after information that is to be displayed on cathode ray tube 31 of FIG. 1.

In accordance with an aspect of the invention, the detection process begins by first encoding the sought after magazine number into three Hamming encoded bytes P1', P2' and P3' that will be transmitted as the magazine code byte when the sought after magazine information is being carried by the teletext signal.

To perform the encoding, a memory, such as read only memory ROM 64, has been programmed to store in its memory locations the Hamming encoded bytes for all 4,096 possible packet addresses or magazine numbers. Microprocessor 29 converts the keyboard entered magazine number into address information for ROM 64 to address those memory locations where the Hamming encoded bytes, P1', P2', and P3' of the sought after magazine number are stored.

Microprocessor 29 first addresses the memory location where the P1' magazine code byte is stored to provide at the data output port of ROM 64 the Hamming error encoded magazine code or packet address code byte P1'. The data port of ROM 64 is coupled by way of data bus 66 to each of the latches 44–46. When the P1' encoded magazine number byte is developed at the data port of ROM 64, it is encoded into the P1' latch 44 by an enable signal that is provided from a terminal d1 of a decoder 43 to the enable terminal EN of latch 44. Decoder 43 is a conventional, one-of-three decoder that receives a 2-bit binary signal from microprocessor 29 at input terminals b0 and b1. When the P1' encoded byte is developed at the data port of ROM 44, bit b0 is high activating terminal d1.

When microprocessor 29 next addresses the memory location in ROM 64 where the P2' byte is stored. In this case, bit b1 of decoder 43 is made high, activating terminal d2 of the decoder to enable latch 45 to store the P2' byte. Microprocessor 29 next addresses the memory location in ROM 64 where the P3' byte is stored. In this case, both bits b1 and b0 are high, activating terminal d3 of decoder 43 to enable latch 46 to store the P3' byte. In this manner, the three Hamming encoded magazine number bytes P1', P2', P3', of the sought after magazine number, are stored in latches 44–46 respectively.

The next step in the decoding process is the byte-by-byte comparison of the Hamming encoded magazine code bytes in the teletext signal with the sought after magazine code bytes stored in latches 44–46. To accomplish this comparison, a multiplexer 47 receives the sought after magazine code bytes P1'-P3', at input ports IN1-IN3, respectively, and then successively supplies bytes P1'-P3', in the order named, byte-by-byte, during successive cycles of the byte clock signal to a latch 61. The first loading of latch 61 occurs during the interval that the first byte of the magazine code in the teletext signal is stored in a latch 62 that receives bytes from the output of serial-to-parallel converter 23 of FIG. 1.

To synchronize operation of multiplexer 47 with the incoming teletext signal, a dual one-shot 48 is synchronized by the horizontal sync signal developed on signal line E1 to develop a window signal MCI. Signal MCI is in the high state only during the narrow window or interval around the expected occurrance of the three packet address bytes P1-P3 of the teletext signal. The signal MCI is applied to the enable terminal of a 2-bit counter 49 permitting the counter to be incremented only during the narrow window interval.

At the beginning of each horizontal line, the count developed at output bits b1 and b0 of counter 49 are cleared by application of the horizontal sync signal to the clear terminal CLR of counter 49. The byte clock signal developed on signal line A1 is used to clock counter 49 in synchronism with the appearance of successive magazine code bytes P1-P3 of the teletext signal at the input to latch 62. These bytes are successively loaded into latch 62 by application of the byte clock signal to the LOAD terminal of the latch. Input terminals of a plurality of AND gates 63–65 are coupled to terminals b1 and b0 of counter 49 in a manner that enables the AND gates to energize the select terminals s1–s3 of multiplexer 47 in the correct sequence that permits the sought after magazine code bytes P1′–P3′, stored in latches 44–46, to be successively loaded into latch 61 in synchronism with the successive loading of bytes P1–P3 of the teletext signal into latch 62.

Upon application to the clock input of counter 49 of the first byte clock signal to occur after the counter is enabled by the signal MCI, counter 49 is incremented by one to produce a high at terminal b0 and a high at the output of AND gate 63. Select terminal s1 is emergized, to place at the output of multiplexer 47 the data from the P1′ latch 44. Thus, the P1′ byte is loaded into latch 61 at the same time the P1 byte from the teletext signal is loaded into latch 62. Similarly, upon application of the next byte clock signal to counter 49, terminal b1 becomes high as does the output of AND gate 64. Select terminal s2 is energized to place at the output of multiplexer 47 the data from the P2′ latch 45. During this byte clock interval, latch 61 contains the P2′ byte data and latch 62 contains the corresponding P2 byte data. Upon application of the third byte clock signal to counter 49, terminals b1 and b0 both become high as does the output of AND gate 65. Select terminal s3 is energized, to place at the output of multiplexer 47 the data from the P3′ byte latch 46. During this byte clock interval, latch 61 contains the P3′ byte data and latch 62 contains the corresponding P3 byte data.

The eight output signal lines a0–a7 of latch 61 reflect the states of the corresponding bits of the 8-bit data words P1′–P3′ successively stored in latch 61. The eight output lines b0–b7 of latch 62 reflect the states of the corresponding bits of the 8-bit data words P1–P3 successively stored in latch 62. Output signal lines a0–a7 and corresponding output signal lines b0–b7 are coupled as inputs to EXCLUSIVE OR gates 50–57, respectively. The outputs of EXCLUSIVE OR gates 50–57 are inverted and applied to signal lines L through S, respectively.

EXCLUSIVE OR gates 50–57 form a logic comparator stage 150 that compares, bit-to-corresponding bit the data word stored in latch 61 with the data word stored in latch 62 to determine the similarity between the two data words.

For example, when error free teletext transmission of the sought after magazine is occurring, identity exists between the bytes P1′–P3′ of the sought after packet address and the packet address bytes P1–P3 in the teletext signal. During the three successive byte clock intervals comprising the packet address or magazine code interval, output lines L through S are high.

Output lines L-S are coupled to a logic network 39 in the manner illustrated in FIG. 2. Logic network 39 comprises AND gates 39A–39H and an OR gate 40. The function of logic network 39 is to detect the presence of the sought after magazine code bytes P1′–P3′ in the teletext signal even in the presence of 1-bit error in each of the transmitted bytes, as will be discussed later.

As previously mentioned, when magazine code bytes P1′–P3′ is being transmitted error free in the teletext signal, output signal lines L through S go high and remain high for three successive byte clock intervals comprising the packet address interval. The output of OR gate 40 is high during these three intervals, incrementing three times the output of a 2-bit counter 41. Counter 41 is enabled only during the magazine code interval by application of the signal MCI to an enable terminal EN. The counter output at terminals b1 and b0 is cleared during each horizontal line by application of the horizontal sync pulse to the clear terminal CLR. Thus, if the sought after magazine is being transmitted in the teletext signal, the incrementing of counter 41 three times produces a high output signal at both terminals b1 and b0.

Terminals b1 and b0 are coupled to inputs of an AND gate 42. AND gate 42 is enabled and synchronized by the byte clock signal applied as another input to the AND gate. When bit terminals b1 and b0 go high upon completion of the reception of the third byte of the sought after packet address in the teletext signal, a byte ready signal is developed at the output of AND gate 42 on a signal line C. Generation of the byte ready signal is an indication that teletext transmission of the sought after magazine is occurring. As described previously, the byte ready signal is used in decoder 20 of FIG. 1 to enable byte latch 26 to pass through the teletext data bytes into memory 27 for further processing in the decoder.

Logic network 39 performs the task of detecting the transmission of the sought after bytes of the packet address in the teletext signal even in the presence of 1-bit error in the transmission of any bytes. If a 1-bit error occurrs in transmission, the output of the associated EXCLUSIVE OR gate of comparator stage 150 goes low rather than high. Logic network 39 takes this fact into account to nevertheless produce a high signal at the output of OR gate 40 to correctly increment counter 41. To obtain this result, logic network 39 advantageously uses Quine McCloskey minimization techniques to derive, by hardware implementation, the prime implicants and the optimal logic switching function that detects a sought after byte of data even when that byte contains a 1-bit error. An example of the application of the Quine McCloskey minimization technique to the detection of a sought after, error encoded, byte of teletext data, is given in aforementioned Gurumurthy U.S. patent application.

One notes from the description given of the operation of magazine code detector 33 embodying the invention, detection of the sought after magazine code bytes P1′–P3′ in the teletext signal is accomplished without the necessity for decoding the Hamming error encoded magazine code bytes P1–P3 in the teletext signal. Had decoupling been required, the structure of magazine code dectector 33 would have been unnecessarily complicated with additional hardware and relatively complex algorithms. By first encoding the sought after magazine number that the user entered into microprocessor 29, the relatively straight forward and uncomplicated logic structure of FIG. 2 may be used.

What is claimed is:

1. A decoder capable of detecting a sought after item of information in an error-encoded teletext-like signal, comprising:

means for forming incoming bytes of data in response to a transmission of said error encoded teletext-like signal that contains bytes of data encoded using an error code that discloses the presence of an error in the transmission of said teletext-like signal;

means for generating an uncoded binary signal that represents a sought after item of information;

an encoder responsive to said binary signal for generating at an output thereof in accordance with said error code an error encoded byte representing said sought after item of information; and a detector coupled to the output of said encoder and responsive to said incoming bytes of data for detecting the presence of said sought after item of information in the teletext-like signal.

2. A decoder according to claim 1 wherein said encoder comprises a memory having locations where there are stored a plurality of error encoder bytes representing different items of information and means responsive to the generated binary signal for addressing the memory location where there is stored the error encoded byte that represents the sought after item of information.

3. A decoder according to claim 2 wherein said detector comprises a comparator stage for logically comparing said error encoded byte representing said sought after item of information to said incoming byte of data.

4. A decoder according to claim 1 wherein said sought after item of information comprises a packet address of a sought after data channel in a teletext transmission system and wherein said encoder generates in accordance with said error code encoded bytes representing the sought after packet address.

5. A decoder according to claim 4 wherein said detector comprises a comparator stage for logically comparing encoded packet address bytes of said incoming bytes of data to the respective encoded bytes generated by said encoder to detect teletext transmission on said sought after data channel.

* * * * *